United States Patent Office 3,453,095
Patented July 1, 1969

1

3,453,095
OXIDATION METHOD OF PRODUCING GLASS HAVING AN INCREASED BREAKING STRENGTH
David Gordon Loukes, Prescot, and James Maurice Hardman, Widnes, England, assignors to Pilkington Brothers Limited, Liverpool, England, a corporation of Great Britain
No Drawing. Filed Mar. 19, 1965, Ser. No. 441,329
Claims priority, application Great Britain, Mar. 23, 1964, 12,200/64
Int. Cl. C03c 17/06, 21/00
U.S. Cl. 65—30                    10 Claims

ABSTRACT OF THE DISCLOSURE

A method of producing glass having an increased breaking strength comprising forming glass containing sodium ions and whose surfaces are substantially stress free, producing in that glass surface layers rich in tin in the form of a stannous compound, and heat treating the glass in an oxygen-containing atmosphere at a temperature less than the strain point of the glass, so that the tin is converted to its stannic form thereby forming a compressional layer at the surface of the glass by changing the molecular volume in situ and strengthening the glass.

---

This invention relates to methods of producing glass having an increased breaking strength and to the strengthened glass so produced.

Conventional methods of increasing the breaking strength of the glass involve the formation in a glass article or sheet of a stress pattern which is achieved by heating the glass above its strain point and then chilling the glass surfaces using a chilling medium in the process known as toughening the glass.

It is an object of the present invention to produce a strengthened glass article by a process which avoids the use of a large volume of a chilling medium.

According to the present invention, the breaking strength of a glass article is increased by causing the surfaces of the glass to take up an element or elements while the glass is at a temperature near, preferably below, its strain point so that the element or elements taken up by the glass enters the glass surfaces while these surfaces are in a state in which they will not be deformed. Consequently the effect of taking up the additional element or elements is to put the surfaces of the glass article into a state of compression.

The present invention provides a method of producing glass having an increased breaking strength comprising the step of causing the surface layers of the glass, rich in reactive elements or compounds to absorb and react with one or more further elements or compounds which are in contact with the glass at a temperature near or below the strain point of the glass whereby there are formed in the glass surface layers of pressure.

Desirably the reaction in which the surfaces of the glass take up an element or elements is carried out at a temperature below the strain point of the glass, so that there are realised, in the surfaces of the glass, the maximum compressive forces for the quantity of the element or elements taken up. At higher temperatures, for example

2 temperatures just above the strain point of the glass, the reaction to take up the element or elements proceeds more quickly, so that more of the element or elements is introduced in a given time, but there is some relaxation of the consequential stresses in the glass. However, the reaction to introduce the element or elements proceeds more quickly than the relaxation of stresses at temperatures not more than about 50° C. above the strain point, so that performance of the reaction at these higher temperatures may, under certain conditions, be advantageous in increasing the breaking strength of the glass article.

The element or elements which are taken up by the glass combine chemically with an element or compound already present in the glass, so that the present invention provides a chemical method of increasing the strength of a glass article.

According to the present invention, there is provided a method of producing glass having an increased breaking strength comprising the step of oxidising glass having surface layers rich in a material capable of being chemically oxidised by taking up an element or elements which can form anions, the oxidation being effected at a temperature near or below the strain point of the glass, whereby there are formed in the glass surface layers of compression.

The term "oxidising" is used here in its widest chemical sense, and refers not merely to the transfer of oxygen but to the transfer of other elements capable of forming anions, for example sulphur or chlorine.

Conveniently, the glass which is to be strengthened has present in its surface layers a lower valency compound of an element exhibiting more than one valency state and the introduction or "taking-up" of the element or elements is effected by a conversion of the lower valency compound into a higher valency compound of the same element.

More particularly the present invention provides a method of producing glass having an increased breaking strength, comprising the step of heat treating glass having its surface layers rich in a lower valency compound of an element exhibiting more than one valency state to convert the said compound into another compound of the element, wherein said element exhibits a higher valency state, the conversion being effected by taking up an element or elements which can form anions from the surroundings at a temperature below the strain point of the glass, whereby there are formed in the glass surface layers of compression.

Advantageously the invention provides a method of producing glass having an increased breaking strength, comprising the steps of heat treating glass having its surface layers rich in an element, for example tin, which is not exhibiting its maximum valency state, the heat treatment being performed in an oxygen-containing atmosphere and at a temperature near or below the strain point of the glass so that the said element, for example tin, takes up oxygen from the surrounding atmosphere and layers of compression in the glass surface are formed by the conversion of at least part of the said element, for example tin, into a compound in which the said element exhibits a higher valency state.

In the case when the glass article to be toughened by a method according to the invention is a cut sheet of flat glass, it is desirable that the cut edges should be toughened by the process in accordance with the present invention at the same time that the surfaces of the glass sheet are toughened. It will be understood therefore that when such a sheet of flat glass is treated in accordance with the present invention the surface layers which are rich in a material capable of being chemically oxidised include the surface layers in the cut edges of the flat glass.

The present invention has particular application in the production of flat glass of increased strength, so that there is particularly comprehended by the invention the production of flat glass having in its surface layers a lower valency compound of an element exhibting more than one valency state, for example tin, and the subsequent reaction of the lower valency compound at a temperature below the strain point of the glass to produce another compound of the element exhibiting a higher valency state.

The flat glass having the said lower valency compound in its surface layers may be produced by introducing the said lower valency compound into the glass after the flat glass has been manufactured. Alternatively the said lower valency compound may be formed in the surface layers of the flat glass during the actual manufacture of the flat glass. In the latter case, however, a special treatment of the cut edges of the flat glass is carried out.

Desirably, as already mentioned, the lower valency compound is a stannous compound, and the present invention therefore provides a method of producing glass having an increased breaking strength comprising the steps of producing flat glass having a stannous compound dissolved in the surface layers thereof and reacting the said stannous compound at a temperature below the strain point of the glass to produce a stannic compound by the uptake from the surroundings of an element or elements which can form anions, whereby surface layers of compression are formed in the glass.

The dissolved stannous compound may be, for example, the oxide, chloride or sulphide, and the glass with the increased breaking strength is then produced by converting the stannous compound to the corresponding stannic compound.

From many points of view, the simplest compound to use is the oxide, and from this aspect, therefore, the present invention provides a method of producing glass having an increased strength comprising the steps of producing a flat glass having stannous oxide dissolved in its surface layers and oxidizing the stannous oxide to stannic oxide by maintaining the glass at a temperature below about 600° C. in an atmosphere of oxygen, whereby surface layers of compression are formed in the flat surfaces of the glass by the uptake of oxygen into the glass surfaces.

From our prior Patent No. 3,083,551 it is known to produce plate and sheet glass of soda-lime compositions in ribbon form on the surface of a bath of molten tin. If the molten tin has present in it an oxygen content of the order of 50 parts per million, it is found that the lower surface of the glass ribbon has introduced into it sufficient tin in a state suitable for the performance of the present invention. The tin which is introduced into the lower surface of the glass ribbon in this way is in a state in which it is not exerting its maximum valency, and the tin is thought to be present in the lower surface of the glass ribbon in the form of stannous oxide.

At the same time, the upper surface of the glass ribbon on the bath of molten metal may be treated with stannous oxide vapour to introduce into this upper surface a sufficient quantity of the stannous oxide so that there are comparable concentrations of stannous oxide in both the upper and lower surfaces of the glass ribbon which is taken up from the bath of molten tin.

Conveniently the stannous oxide vapour is formed by a partial oxidation of a portion of the molten tin comprising the bath. Preferably a portion of the molten tin in a pocket adjacent the bath is partially oxidised and the stannous oxide vapour obtained is circulated through ducts directly into contact with selected parts of the upper surface of the ribbon of glass on the bath. Advantageously the ribbon of glass whose upper surface is so treated is at a temperature of at least 850° C.

Alternatively the stannous oxide vapour may be formed immediately adjacent to the glass ribbon on the bath of molten tin by passing a limited quantity of oxygen-containing gas through a duct and into contact with the surface of the molten tin of the bath. The stannous oxide vapour so formed adjacent to the glass ribbon naturally diffuses over the surface of the glass ribbon and the upper surface of the glass ribbon at a temperature of the order of 800° C.—900° C. takes up a proportion of the stannous oxide.

The introduction of tin into the lower surface of the glass occurs during the passage of the glass ribbon at a temperature of the order of 800° C. to 900° C. over the surface of the molten tin comprising the bath. It is thought that the tin so introduced into the lower surface of the glass ribbon is present in the lower surface of the ribbon in the form of stannous oxide.

The glass ribbon taken up from the bath is subsequently cooled and cut into sheets. The cut edges of the sheets of glass are treated with a tin compound, for example stannous chloride in solution, and then the cut glass sheets are maintained at a temperature of about 450° C. to 500° C. in an atmosphere of oxygen or ozone so that the stannous oxide in the surface layers absorbs oxygen and layers of compression are formed in both the flat surfaces and all the cut edges of the glass. If glass of a very high degree of strengthening is required, it is desirable to smooth the cut edges before treating with a tin compound and also to pre-heat the glass in an inert atmosphere up to about 800° C. for a short time to allow tin ions from the tin compound to diffuse in quantity into the cut edges. As an alternative to the use of an atmosphere of oxygen or ozone, the cut glass sheet may be immersed in a molten oxidizing agent, for example molten potassium nitrate, to effect the conversion of the stannous compounds to stannic compounds.

It is found that the compressive forces present in the surface layers of glass are increased by maintaining the glass at a temperature around 500° C. in an oxygen atmosphere at a pressure greater than atmospheric pressure. Pressures ranging, for example, from 5 to 100 atmospheres may be used.

According to this aspect of the invention, therefore, there is provided a method of producing glass having an increased breaking strength, comprising the steps of floating the glass on the surface of a bath of molten tin having an oxygen content of the order of 50 parts per million so that tin is introduced into the surface of the glass which is in contact with the bath, simultaneously contacting the upper surface of the glass floating on the bath with a stannous oxide vapour so that stannous oxide is introduced into the upper surface of the glass on the bath, removing the glass from the bath of molten tin, cooling the glass, and subsequently maintaining the glass at a temperature of about 450° C. to 500° C. in an atmosphere of oxygen, whereby tin present in the surface layers of the glass is converted to stannic oxide by uptake of oxygen from the atmosphere, and surface layers of compression are formed in both the flat surfaces of the glass.

As an alternative to treating the upper surface of a glass ribbon on a molten tin bath with stannous oxide vapour to obatin a surface layer rich in tin, there may be provided edge rollers near the exit end of the bath for forcing the formed glass ribbon beneath the surface of the molten tin after the ribbon is sufficiently stiff not to be deformed by the action of the edge rollers. In this method the glass ribbon becomes totally immersed in the molten tin at a temperature in the region of 650–700° C. and the upper surface of the ribbon takes up tin from the molten bath in a similar way to the lower surface in the method previously described. The tin in the surfaces of the glass ribbon is in a valency state lower than its maximum, and the tin is thought to be present in both surfaces as stannous oxide.

The glass ribbon which is taken up from the bath is then cooled, cut as desired and treated in an oxidising atmohphere as described above to obtain a final glass with surface layers of compression.

Instead of forming a glass ribbon having its surfaces rich in stannous oxide on a bath of molten tin, stannous oxide, for example, may be introduced into the surfaces of a cut sheet of flat glass or into the surfaces of a glass article, for example a glass insulator. This may be done by immersing the glass article or sheet in molten tin, for example in the region of 800° C. to 900° C. The molten tin contains some 50 parts per million of oxygen which causes the transfer into the surface layers of the glass of stannous oxide. Using temperatures in the region of 800° C. to 900° C., a sufficient transfer of stannous oxide into the surface layers of the glass is obtained by immersing the glass in the molten tin for about five minutes.

When the glass article or sheet is removed from the molten tin, it is cooled to a temperature below about 550° C. in a non-oxidising atmosphere and then maintained at a temperature of about 500° C. in an oxygen atmosphere to effect oxidation of the stannous oxide to stannic oxide. At the temperature of 500° C., the glass surface is not able to deform when the stannic oxide is developed therein by oxidation, and consequently surface layers of compression are formed in the flat surfaces of the glass sheet.

When the stannous oxide is introduced into the surface of the glass by immersing the glass sheet or article in molten tin containing a proportion of oxygen, it is preferred for the treatment to take place at temperatures of the order of 800° to 900° C. Lower temperatures than this may be used, provided that the temperature of the molten tin is not less than 600° C. However, the glass has to be in contact with the molten tin for longer periods, when temperatures from 600° C. to 800° C. are employed.

As another alternative, stannous oxide may be introduced into the surface layers of the glass sheet or article by placing the sheet or article in an atmosphere containing stannous oxide vapour. On the other hand, if it is desired to introduce stannous oxide into the surface layers of flat glass by a continuous process using stannous oxide vapour only, then a ribbon of glass manufactured by the method described in our prior Patent No. 3,083,551 may be passed, after the ribbon has been removed from the bath of molten tin, a few inches over tin which is being oxidised in an enclosed zone. The stannous vapour is in contact with both surfaces of the glass ribbon and penetrates into the surface layers of the glass.

As yet another alternative stannous ions may be introduced into the surfaces and cut edges of sheet glass or of glass articles by contact with stannous chloride vapours or molten stannous chloride so that ion exchange with sodium ions, for example, in the glass can take place.

Sheets cut from the glass containing stannous oxide in their surface layers, and having edges which have been treated with stannous chloride are then maintained in an atmosphere of oxygen at a temperature of 500° C. in order to effect conversion of the stannous compounds into stannic compounds, the oxygen atmosphere being preferably at a pressure of at least 10 atmospheres.

All the methods so far described have contemplated simply the strengthening of the glass without altering its shape from that of a plane sheet. However, the glass sheet may be bent after the lower valency compound of the element, for example the stannous oxide, has been incorporated in its surfaces by any conventional bending process, provided that the bending process is carried out in a nitrogen or other inert atmosphere so that oxidation of the stannous oxide to stannic oxide while the glass is in a plastic deformable state is prevented. Once the bending operation is completed, the glass is cooled to a temperature below about 550° C. and then maintained in the oxygen atmosphere to effect conversion of the stannous oxide to stannic oxide without any deformation of the surfaces of the bent glass sheet.

As alternatives to the use of stannous compounds, compounds of other metals with variable valencies, for example lead, manganese and vanadium, may readily be employed.

We claim:

1. A method of producing glass having an increased breaking strength, comprising producing in the surface layers of glass containing alkali metal ions a substantial amount of an element which is chemically in a reduced state, and contacting the surfaces of the glass at a temperature less than the strain point of the glass with a material which reacts with the reduced element in the surface layers of the glass to convert it by the reaction into a higher valency compound of the element thereby forming a compressional layer at the surface of the glass by changing the molecular volume in situ and strengthening the glass.

2. A method according to claim 1, wherein said element is present in the form of an oxide and said element has more than one valency, and at least part of the oxide is present in the lower valency state.

3. A method according to claim 1, wherein the surface layers of the glass are heated under oxidizing conditions.

4. A method according to claim 1 wherein the glass is soda-lime glass and the element is a metal selected from the group consisting of tin, lead, manganese, and vanadium.

5. A method of producing glass having an increased breaking strength, comprising forming glass containing alkali metal ions and whose surfaces are substantially stress free, producing in surface layers of that glass a substantial amount of tin in the form of a stannous compound, and heating the glass in an oxygen-containing atmosphere at a temperature less than the strain point of the glass, so that the tin is converted to its stannic form thereby forming a compressional layer at the surface of the glass by changing the molecular volume in situ and strengthening the glass.

6. A method according to claim 5, wherein flat glass is produced by having stannous oxide dissolved in its surface layers and oxidising the stannous oxide to stannic oxide by maintaining the glass at a temperature below about 600° C. in an atmosphere of oxygen, whereby surface layers of compression are formed in the flat surfaces of the glass by the uptake of oxygen into the glass surfaces.

7. A method according to claim 6, wherein the glass is immersed in molten tin at a temperature greater than 600° C., the tin having present therein a proportion of oxygen sufficient for some tin to become incorporated in the surface layers of the glass sheet, and subsequently maintaining the glass at a temperature between about 450° C. and 500° C. in an atmosphere of oxygen.

8. A method according to claim 6, wherein the glass is floated on the surface of a bath of molten tin having an oxygen content of the order of 50 parts per million so that tin is introduced into the surface of the glass which is in contact with the bath, simultaneously contacting the upper surface of the glass floating on the bath with a stannous oxide vapour so that stannous oxide is introduced into the upper suface of the glass on the bath, removing the glass from the bath of molten tin, cooling the glass, and subsequently maintaining the glass at a temperature of about 450° C. to 500° C. in an atmosphere of oxygen, whereby tin present in the surface layers of the glass is converted to stannic oxide by uptake of oxygen from the atmosphere, and surface layers of compression are formed in both the flat surfaces of the glass.

9. A method according to claim 6, wherein the oxygen in the said atmosphere is maintained at a pressure of the order of 10 atmospheres.

10. An article of glass formed by the process of claim 1.

References Cited

UNITED STATES PATENTS 2,779,136  1/1957  Hood et al. _____ 65—30
3,218,220  11/1965  Weber _____ 65—30

OTHER REFERENCES

Kistler: "Stresses in Glass Produced by Nonuniform Exchange of Monovalent Ions," J. of Amer. Cer. Soc., vol. 45, No. 2, February 1962, pp. 59–68.

S. LEON BASHORE, *Primary Examiner.*

J. H. HARMAN, *Assistant Examiner.*

U.S. Cl. X.R.

65—60, 111, 114